United States Patent
Parriaux et al.

(10) Patent No.: US 6,680,799 B1
(45) Date of Patent: Jan. 20, 2004

(54) OPTICAL POLARIZING DEVICE AND LASER POLARIZATION DEVICE

(75) Inventors: Olivier Parriaux, Saint Etienne (FR); Florent Pigeon, Saint Etienne (FR); Alexander V. Tishchenko, Saint Etienne (FR)

(73) Assignee: Universite Jean Monnet, Saint Etienne (FR)

( * ) Notice: Subject to any disclaimer, the term of this patent is extended or adjusted under 35 U.S.C. 154(b) by 49 days.

(21) Appl. No.: 10/048,661

(22) PCT Filed: Jul. 28, 2000

(86) PCT No.: PCT/EP00/07540
§ 371 (c)(1),
(2), (4) Date: May 23, 2002

(87) PCT Pub. No.: WO01/09650
PCT Pub. Date: Feb. 8, 2001

Related U.S. Application Data
(60) Provisional application No. 60/146,806, filed on Aug. 2, 1999.

(51) Int. Cl.[7] .................................. G02B 5/18
(52) U.S. Cl. ..................... 359/569; 359/566; 359/584; 372/27; 372/102; 372/106; 372/19; 257/98
(58) Field of Search .................. 359/566, 569, 359/584, 572; 372/27, 102, 106, 99, 19; 257/98; 385/14, 37

(56) References Cited

U.S. PATENT DOCUMENTS

| | | | |
|---|---|---|---|
| 4,828,356 A | 5/1989 | Hobrock et al. | |
| 5,255,278 A | * 10/1993 | Yamanaka | 372/45 |
| 5,555,255 A | * 9/1996 | Kock | 372/96 |
| 5,726,805 A | 3/1998 | Kaushik et al. | |

FOREIGN PATENT DOCUMENTS

EP 0 798 574 A2 10/1997

OTHER PUBLICATIONS

V.N. Bel'tyugov et al., "Polarizing laser mirrors for normal light incidence", SPIE Vol 1782, pp. 206–211, 1992.*
J–H. Ser et al., "Polarization stabilization of vertical cavity top surface emitting lasers by inscription of fine metal interlaced gratings", Appl. Phys. Lett. 66(21), pp. 2769–2771, 1995.*
Patent Abstracts of Japan vol. 1996, No. 6, Jun. 28, 1996 and JP 09 056049 A, Feb. 27, 1996.
* Bel'tyugov, V.N., et al., "Dielectric laser mirror with phase anisotropy," Quantum Electronics, American Institute of Physics, Woodbury, NY, US, vol. 24, No. 9, Sep. 1, 1994, pp. 811–813, XP000479862. ISSN: 1063–7818.
* Pigeon, F., et al., "Polarizing grating mirror for CW Nd:YAG microchip lasers," IEEE Photonics Technology Letters, vol. 12, No. 6, Jun. 2000, pp. 648–651, XP000980698 IEEE Inc. New York, US ISSN: 1041–1135.
* Bel'tyugov, V.N., et al., "Polarizing laser mirrors for normal light incidence," Proceedings of the SPIE, vol. 1782, Thin Films for Optical Systems (1992), XP000956133.
* Ser, J–H, et al., "Polarizing stabilization of vertical–cavity top–surface–emitting lasers by inscription for fine metal–interlaced gratings," Applied Physics Letters, American Institute of Physics. New York, US, vol. 66, No. 21, May 22, 1995, pp. 2769–2771, XP000507414. ISSN: 0003–6951.
* References furnished by International Bureau.

* cited by examiner

*Primary Examiner*—Drew Dunn
*Assistant Examiner*—Leo Boutsikaris
(74) *Attorney, Agent, or Firm*—Weingarten, Schurgin, Gagnebin & Lebovici LLP (57) ABSTRACT

The invention concerns a light reflecting element comprising a substrate (10), a multilayer mirror (20) and optical coupling means (32, 40) comprising a diffraction grating (40); whereby the reflection coefficient of one polarization is damped without damping the reflection coefficient of the orthogonal polarization over a broad wavelength range and with a large tolerance on the optogeometrical parameters of the device.

52 Claims, 7 Drawing Sheets

OPTICAL POLARIZING DEVICE AND LASER POLARIZATION DEVICE

This application claims benefit of 60/146,806 filed Aug. 2, 1999.

BACKGROUND OF THE INVENTION

This invention relates to multidielectric mirrors and to coupling devices, in particular for use in a laser device. It also concerns optical devices comprising a multilayer mirror and a grating, said device being of high polarization selectivity, of particularly large structural tolerance, and of particularly large wavelength range.

A microchip laser polarization device is known from the market (Nanolase, Grenoble, France) whereby a mechanical stress induced transversally on a Nd:YAG microchip laser favours laser emission with the electric field polarized along the applied external force. The disadvantage of such solution is that it is a one by one solution applied to an otherwise batch production process of microlasers. Such solution is also limited because it can practically only lead to a uniform distribution of the electric field.

Another device is known from the scientific literature (V. N. Bel'tyugov, S. G. Protsenko, Y. V. Troitsky, "Polarizing laser mirrors for normal light incidence ", Proc. SPIE, Vol. 1782, 1992, p. 206) comprising a multilayer mirror composed of at least one corrugated interface between layers whereby the grating couples the undesired polarization of a gas laser into a guided mode of the multilayer, and induces a differential loss in the laser cavity between the coupled undesired polarization and the uncoupled desired polarization.

The practical limitations of this device are following.

In case one interface only is corrugated, the coupling efficiency into a guided mode of the multilayer is too weak for the device to be applied to microchip lasers where the beam diameter is 100 $\mu$m or less; furthermore, the grating would in such case diffract the lasing polarization into diffraction orders propagating into the high index active crystal substrate. This results in non-acceptable losses. Moreover, the weakness of the coupling efficiency has the first consequence that the linewidth of the coupling phenomenon is very narrow and prevents the polarizing effect to be effective over a wide wavelength range, as for instance over the full gain bandwidth of about one nanometer of Nd:YAG lasers; a second consequence is that the spectral position of the narrow line at which the desired polarising effect occurs is highly dependent on the multilayer characteristics, thus on the fluctuations of its manufacturing conditions, and on the environmental dependence of the refractive index of the layers especially on humidity and temperature. This renders the device of the state of the art unusable in practice since it would require individual post-trimming and temperature control. In case all, or a large number of interfaces are corrugated, the coupling efficiency is increased but these corrugations lead to a perturbation of the layer deposition conditions which will be even less reproducible and provoke scattering losses on the lasing polarization.

SUMMARY OF THE INVENTION

Accordingly, it is a general object of the present invention to provide a novel and useful grating device such as a polarizing mirror or a polarizing coupling device in which the above described problems are eliminated.

Another, more specific object of the invention is to provide tolerant coupling means comprizing a grating capable of damping one polarization of a laser beam over a large wavelength range while maintaining the resulting scattering at a low level.

A first embodiment of a device according to the invention is an optical device comprising a substrate, a multilayer mirror, a pair of low and high refractive index layers, and a corrugation grating in said high refractive index layer.

Such a device can be used as a laser coupler or as a coupler in a laser device.

The combination of the pair of low and high refractive index layer, and of the corrugation grating in said high refractive index layer, results in a reduction of the reflection coefficient of a first polarization, by means of a destructive interference in the multilayer mirror for this first polarization, with essentially no change of the reflection coefficient for the other (second) polarization.

A beam of light is directed toward the optical device according to the invention through said substrate. In other words, the light beam is incident from the substrate side. The beam then successively traverses the multilayer mirror and the pair of low and high refractive index layers. One polarisation of the beam is reflected as in the absence of the grating. The other polarisation is reflected differently due to the grating, which is placed or made on, or in, the last high index layer, for example at the air side.

The multilayer mirror reflects both polarizations equally. The polarizing function is performed by the grating substructure comprising the said corrugated pair of low and high refractive index layers.

For a corrugation grating on the last layer to have a non-negligible effect on the lasing condition in the cavity, the polarization selection effect can not simply be the coupling of one polarization into a guided mode of the multilayer as disclosed in the state of the art, for example in the article by Bel'tyugov cited above. The device according to the invention teaches the use of an abnormal reflection from the last high index waveguide grating under normal incidence: that is, when the incident polarization is coupled into the last high index layer mode, the optical power is reflected back from the grating with a phaseshift of $\pi$. Thus, the reflection of the damped polarization is not damped by its coupling into a waveguide mode, but it is efficiently reflected back into the cavity with a $\pi$ phaseshift by virtue of the said abnormal reflection, thus giving rise to an appreciable degree of destructive interference in the multilayer mirror for the coupled polarization, and consequently inducing on the latter a significantly more efficient damping.

Those familiar to the art will not be tempted to place the grating on the side of the last layer of the multidielectric mirror, for example at the air side, because the field is much weaker there than in the first layers, and because, in case of use in a laser device it is believed that the coupling of the polarization to be damped into a waveguide mode nearly outside the laser resonator will hardly have an influence on the intra-cavity polarization lasing conditions.

The substrate can be a laser active material substrate, for example the active material of a microchip laser.

The first embodiment of the device according to the invention can be advantageously used at one side of a laser cavity. Its efficiency is so high that the necessary damping of the coupled polarization can be obtained with a grating of very small depth, thus leading to a reduced scattering.

The efficiency of the grating is high because the last high index layer, acting as a waveguide, concentrates the modal field in the said layer, and in particular in the grating zone.

The high radiation efficiency of the grating reduces the quality factor of the wavelength resonance and gives rise to a large wavelength tolerance of the grating mode coupling.

The first embodiment of the invention being substantially lossless, the damped polarization is not necessarily filtered out. It can thus be a lossless polarization filter exhibiting two different reflection coefficients for the two incident polarisations.

The polarization device according to the above first embodiment offers the following specific advantages:

- it prevents the diffraction of the uncoupled polarization into the substrate, in particular in the case of a microchip laser,
- the grating causes little scattering since it is not at the substrate side; in the case of a laser, it is not used at an active medium side within the laser resonator but at the air side,
- it can provide a substantial and controllable difference between the reflection coefficient of the two polarizations without inducing any power loss on the polarization having the smaller reflection coefficient.
- it can induce the polarization selection of very narrow beams,
- it has a particularly large spectral bandwidth.

The second embodiment of the invention concerns an optical mirror, comprising a multilayer mirror, a grating and a metal or metallized substrate or a metal coated substrate, the multilayer mirror being located between the substrate and the grating.

The reduction of the reflection coefficient of the damped polarization is achieved by means of the coupling of the latter to one of the lossy modes of said multilayer deposited onto said substrate. In a laser device, the multilayer is at the substrate side which is at the inside of the laser cavity.

Whereas the coupling of the damped polarization to a guided mode of the multilayer according to the state of the art (V. N. Bel'tyugov et al) leads to a narrow band coupling, the device according to the second embodiment of the invention leads to a broader band coupling since a guided mode of the air and metal bordered multilayer waveguide suffers large losses.

Coupling to a TM mode is preferred. However, coupling to a TE mode is also possible, although the coupling linewidth is narrower.

The parameters of a structure achieving high and wavelength tolerant absorption can be found out by means of an available diffraction modeling code. The parameters can for instance be the number of layers of the multilayer, its first and last layers (low or high index), the type of metal, the thickness of the metal film, the period and depth of the grating.

The specific advantages of the second embodiment of the invention for a laser mirror are the following ones:

- the metal borded multilayer offers a larger number of possible TM modes, and new types of modes which do not exist in the coupler of the state of art: two plasmon modes and all modes of effective index smaller than the substrate index ns,
- the propagation constants of the TE modes and TM modes are interleaved, thus the lasing TE polarization does not suffer losses,
- a metal substrate is compatible with possible fluid cooling in high power applications,
- the coupled mode loss, thus the polarization filtering bandwidth, can be adjusted through the choice of the proper metal,
- the metal substrate or film is placed beyond the last layer of the multilayer which usually has a large number of layers. Therefore the field of the incident lasing beam at this location is close to zero.

The third embodiment of the invention concerns both a mirror and a coupler. Alike in the second embodiment, the multilayer is at the subtrate side facing the laser cavity, the grating being in the last layer. Here, the device comprises the grating, a multilayer, and the substrate, the grating having a period such that the incident damped polarization is coupled to one of the first order leaky modes of the multilayer of the same polarization. Leaky modes are transverse electromagnetic field resonances with total reflection at the air side and high partial reflection at the substrate side. The leakage of power in such resonance causes the coupling into such mode to be broadband and tolerant. Since the propagation constants of leaky modes of the two orthogonal polarizations are interleaved, the structure achieving high and wavelength tolerant leakage for the damped polarization and essentially zero leakage for the lasing polarization can be found out by means of codes available on the market.

The structure parameters which can be adjusted are for instance the number of layers in the multilayer, and/or the type of its first and last layers (low or high index), and/or the depth and period of the grating, and/or the polarisation.

The specific advantages of this third embodiment are the following ones:

- the grating period is relatively large, thus easier to fabricate, and is essentially unique and predetermined since the first order leaky mode of so large a multilayer waveguide has an effective index very close to that of the substrate,
- the third embodiment can be used as both a laser mirror and a laser coupler,
- the flux resistance of the third embodiment is large since the leaky mode field does not exhibit a large amplitude anywhere in the structure, and since the power loss mechanism is not of an absorptive nature.

Beyond the specific advantages of the three embodiments which have been listed above, the common advantages of all three embodiments of the invention are the following ones:

- the multilayer mirror of the device according to the invention can be that of a standard laser mirror,
- technologically, the grating fabrication step comes after the whole stack of layers have been deposited,
- the polarization filtering is performed by a device which can be produced by batch planar technologies,
- the grating device according to the invention can define linear polarization distributions which are different from rectilinear.

For widening the wavelength range over which the reflection coefficient for one polarization is decreased, a device according to any embodiment of the present invention is so designed that the grating causes a substantial fall of the quality factor of the coupled mode for the incident beam of he said polarization.

BRIEF DESCRIPTION OF THE DRAWINGS

The above and other objects, features and advantages of he present invention will be more apparent from the following detailed description when read in conjunction with the accompanying drawings in which.

DESCRIPTION OF THE PREFERRED EMBODIMENTS

Several detailed embodiments of the invention are given herebelow. Each embodiment comprises a multilayer structure. A "mode" of such a multilayer structure is a transverse electromagnetic field resonance propagating in the direction of the planes of the layered structure. The spectral linewidth of this spatial resonance is related with the strength of its coupling with the incident beam, and/or with its own absorption or leakage losses.

Figure 1:
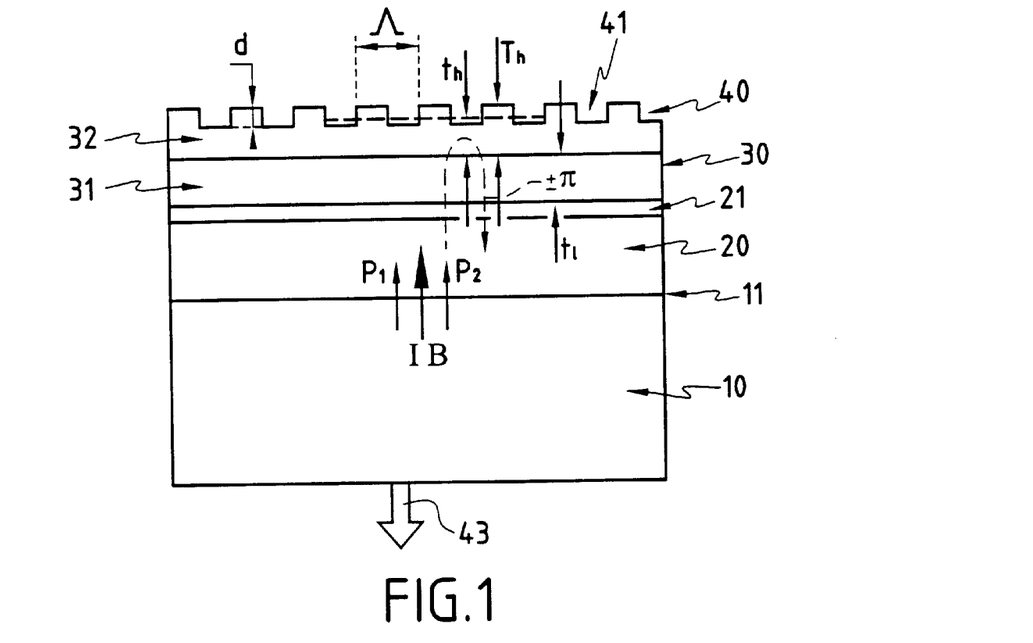
FIG. 1 is the cross-section view normal to the grating lines of the first embodiment of the device according to the invention.

FIG. 1 is the cross-section view of a first embodiment of the device according to the invention. An incident beam IB of spectral width B is preferably directed from the substrate side.

The device according to this first embodiment is composed of a substrate 10, a multilayer mirror 20, a pair of layers 30, and a diffraction grating 40.

The substrate 10, of upper surface 11, can be an amorphous material like glass. It can also be a laser crystal like YAG or a birefringent crystal.

The multilayer mirror 20, which can be a standard one, comprises the number of layers of alternate low and high refractive index needed to provide the desired reflection coefficient over the desired bandwidth.

The last layer 21 of the multilayer mirror 20 can be of high index $n_h$ or low index $n_1$. Its thickness is $t_s$; layer 21 is often a λ/4 layer which means that $t_s=\lambda/(4n_h)$ or $t_s=\lambda/(4n_1)$ essentially.

An additional optical coupling means comprises the pair of layers 30 deposited by standard dielectric film techniques like ion plating, electron beam evaporation, sputtering, or ion assisted sputtering. This pair of layers 30 comprises a first layer 31 of refractive index $n_1$ (low refractive index) and thickness $t_1$, and a second layer 32 of index $n_h$ (high refractive index: $n_h>n_1$) and thickness $T_h$.

The diffraction grating 40 is etched into the second layer 32. Grating 40 comprises grooves 41 of period Λ and depth d. The second layer 32 is an optical waveguide of index $n_h$. It propagates at least the $TE_0$ mode at the central wavelength $\lambda_0$ of the laser mirror 20. It can also propagate other modes, in particular when its thickness is increased. A polarisation can be damped or filtered by the device if it couples to one mode propagated by the second layer or the optical waveguide 32.

In order to perturb the operation of the multilayer mirror 20 as less as possible, the thickness and index of the additional pair of low and high index layers 31, 32 are, regardless of the effect of the grating 40, preferably set to an additional optical path providing a total round trip additional optical phase equal to an integer number of essentially 2π at the wavelength of operation λ (within spectral bandwidth B):

$$2\frac{2\pi}{\lambda}(t_h n_h + t_l n_l) = 2m\pi, m = 1, \text{ or } 2, \text{ or } 3 \tag{1}$$

where $t_h$ is the average thickness of the last high index layer 32 (seen by an optical wave incident normally onto the substrate surface 11), $t_1$ is the thickness of the last low index layer 31, and $n_h$, $n_1$, are the refractive index of the last high and low index layers 32 and 31 respectively.

Equation (1) holds for the case where the last layer 21 of the multilayer is of high index. When this last layer 21 of the multilayer is of low index, the following expression should be used:

$$2\frac{2\pi}{\lambda}(t_h n_h + t_l n_l) = (2m-1)\pi, m = 2, \text{ or } 3, \tag{1'}$$

In the presence of the polarizing grating of depth d, $t_h$ is defined as the average thickness of the last high index layer 32 at the line located in the middle of the grating corrugation (see FIG. 1) in case the line/space ratio of the grating corrugation is 1:1 (in this case, it is essentially equal to $t_h=T_h-d/2$).

If the corrugation line/space ratio is not 1:1, $t_h$ is defined at a line located between the bottom and the top of the grooves depending on the duty cycle of the grating grooves.

In a preferred embodiment, the index $n_h$ and the thickness $t_h$ of the last high index layer are large enough so that the effective index $n_e$ of the mode of the last high index layer 32 to which the undesired polarization is coupled is larger than the substrate index $n_s$; otherwise the reflected (undamped) polarization could be diffracted in the higher index substrate 10.

The materials of the last two layers 31 and 32 are advantageously the same as the materials of the multilayer mirror 20. But they can be different if needed, for instance if the refractive index of the higher index material used in the multilayer mirror 20 is too low.

If m=2, the above condition (1) implies that the thickness $t_h$ and $t_1$ of the last two layers 31, 32 (which thickness increases with m) is larger or significantly larger, by a factor of about 2, than the thickness of the λ/4 layers of a standard multilayer mirror 20. This means in particular that the fundamental mode of the last high index layer 32 has a large effective index $n_e$ which increases with an increasing thickness of layer 32. Therefore, its modal field is essentially confined in the last layer and hardly sees the high index layers of the multidielectric mirror; besides, if $n_h$ is larger or significantly larger than the substrate index $n_s$, the effective index $n_e$ of the coupled mode, which effective index depends on both $n_h$ and the layer thickness, will more surely be larger than $n_s$.

If m=1, the high index layer optical thickness $2\pi n_h t_h/\lambda$ is preferably strictly larger or significantly strictly larger than $\lambda/4$ layers of the standard multilayer mirror 20, the optical thickness $2\pi n_1 t_1/\lambda$ of the low index layer 31 being accordingly smaller than the thickness of the $\lambda/4$ layers of the standard multilayer mirror 20, to allow the effective index $n_e$ of the fundamental mode of the damped polarization to be larger than the refractive index $n_s$ of the substrate, and to allow a confinement of the coupled mode essentially in the last high index layer 32.

Figure 2:
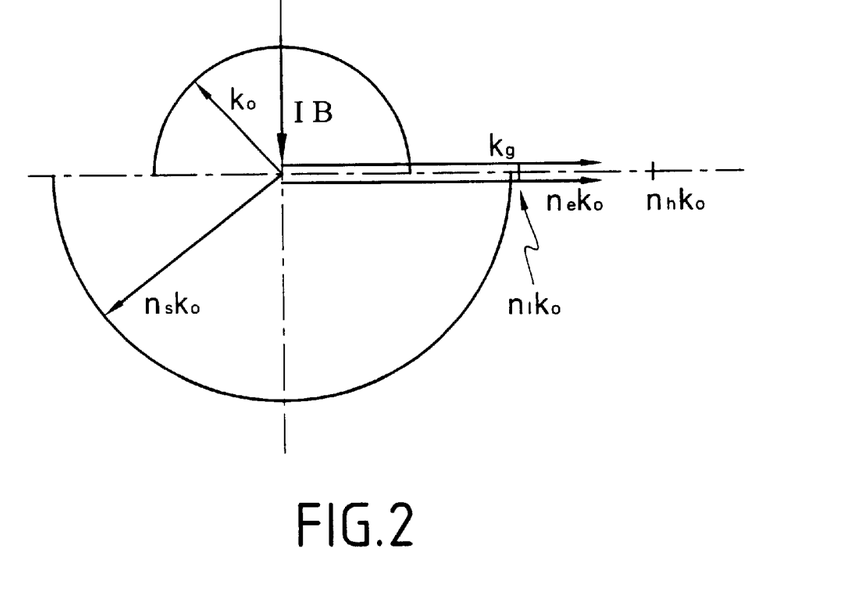
FIG. 2 is the spatial frequency diagram of a particular case of the first embodiment of the device according to the invention.

FIG. 2 is the spatial frequency diagram of the first embodiment of the invention or of the coupling means of this first embodiment. In the spatial frequency domain, the first grating order coupling condition (synchronism condition) between the normally incident free space wave and a guided mode, for abnormal reflection, writes $$K_g = n_e k_0 \quad (2),$$

where $K_g = 2\pi/\Lambda$ is the grating spatial frequency, $k_0 = 2\pi/\lambda$ is the spatial frequency of a free space wave in vacuum ($\lambda$ being one wavelength within spectral bandwidth B), and $n_e$ is the so-called effective index of the coupled mode of the damped polarization.

It is apparent from FIG. 2 that the grating coupling to any mode of a given polarization of layer 32 which has $n_e < n_s$ causes diffraction of the lasing orthogonal polarization into the substrate 10, thus causing undesired losses on the lasing polarization. Any waveguide mode with $n_e > n_s$ can be the mode chosen for filtering out the damped polarization where $n_s$ stands for the refractive index of an isotropic substrate or for the corresponding refractive index of a birefringent substrate. This explains the condition set above on $n_e$ and $n_s$.

For abnormal reflection to take place, the product of the field radiation coefficient $\alpha$ of the waveguide grating by the incident beam diameter w, $\alpha w$, is preferably larger than unity:

$$\alpha w > 1 \quad (3)$$

For example: $\alpha w = 2\pi$.

For narrow beam diameters, this sets a requirement for an unusually large radiation strength of the waveguide grating. For the abnormal reflection to efficiently operate on a small diameter beam as that of a microchip laser for example, the radiation strength, described by the waveguide grating radiation coefficient $\alpha$, is thus preferably strong.

Another condition is known for a preferably high abnormal reflection to take place: it states that the absorption and scattering losses of the waveguide layer are smaller or significantly smaller than the radiation loss of the grating.

More generally, the thickness $t_h$ of the last layer as well as possibly its index $n_h$ are adjusted so as to give rise to the largest possible radiation coefficient $\alpha$. This can be made by maximizing the last layer waveguide modal field in the grating region, and in realizing a constructive interference condition between the outwards and inwards diffraction product taking place in the grating waveguide. This leads to a condition on $t_h$, and possibly on $n_h$, and in turn dictates the ratio between $t_h$ and $t_1$ if the total phaseshift between the top of the standard multilayer mirror and the middle line of the grating corrugation is maintained close to 2 m$\pi$ (see equation (1) above).

For instance, the condition of maximum $\alpha$ in case the damped polarization is the TE polarization (the electric field is parallel to the grating lines) mainly amounts to optimizing the effective index dependent term $(n_h^2 - n_e^2)/(n_e t_{eff})$ of the known analytical expression giving the radiation coefficient $\alpha$ of a TE mode upon radiation in the direction normal to the waveguide by a sinusoidal grating of depth 2s in terms of the opto-geometrical parameters of the waveguide:

$$\alpha = (k_0 s/2)^2 (n_h^2 - n_e^2)(n_h^2 - 1)(n_h^2 - (n_h^2 - n_1^2) \sin^2(n_h k_0 t_h))/ (n_e t_{eff}(n_h^2(n_1 + 1)^2 + (n_h^2 - 1)(n_h^2 - n_1^2) \sin^2(n_h k_0 t_h))), \quad (4)$$

In this expression, $k_0$, $n_h$, $n_1$, $n_e$, $t_h$ have the same meaning as already indicated above. $t_{eff}$ is the effective thickness of known effective thickness of a TE mode given by $$t_{eff} = t_h + 1/(k_0(n_e^2 - n_1^2)^{1/2}) + 1/(k_0(n_e^2 - 1)^{1/2}).$$

The analytical formulae giving the field radiation coefficient $\alpha$ of a sinusoidal grating made in a step index waveguide for TE and TM guided modes can be found in the article by V. A. Sychugov et al. "Light emission from a corrugated dielectric waveguide", Sov. J. Quantum Electron., Vol.10, N° 2, Feb. 1980, p.186–189.

In the case of the TE polarization, $\alpha$ takes the form (4) given above.

In the case it is preferable to damp the TM polarisation instead of the TE polarisation, the radiation coefficient $\alpha$ is also given in the above mentioned article.

These expressions can be used for non-sinusoidal profiles as well: in a non-sinusoidal grating profile, s is the amplitude of the first harmonics in the Fourier series of the grating profile. For instance, in the case of a rectangular grating profile of depth d, of line/space ratio 1:1, $s=0.5(4d/\pi)$, or the depth d of a rectangular grating giving the same $\alpha$ as a sinusoidal profile is simply $d=(2s)\pi/4$.

With the example of low and high index layers of $SiO_2$ and $Ta_2O_5$ (having an index of, respectively, 1.48 and 2.18 at 1.06 $\mu$m wavelength) made by ion plating, a typical radiation coefficient a of several hundreds $cm^{-1}$ can be obtained with a 130 nm deep grating. This sets abnormal reflection conditions for a beam as narrow as w=100 $\mu$m which corresponds to the typical beam width of microchip lasers.

The additional pair of layers 31, 32 with the grating 40 on the high index layer 32 form a coupling means which causes a major damping of the coupled polarization. First, it reflects the incident wave with a phaseshift of $\pi$, characteristics of abnormal reflexion, for the coupled polarization; secondly, the diffraction efficiency giving rise to the said out-of-phase reflection can be optimized by optimizing the high index layer thickness under the condition of 2 m$\pi$ total round trip phaseshift through the pair of layers. This ensures that a grating placed at the side of the multilayer mirror opposite to the substrate can provoke a sufficient damping of the coupled polarization without affecting the other polarization.

The initial thickness $T_h$ of layer 32, then the grating thickness d, are preferably determined so as to provide the maximum radiation coefficient $\alpha$ with the shallowest grating depth d satisfying the condition $\alpha w > 1$ for efficient resonant reflection for a normally incident free space wave of prescribed diameter w.

From the determined average thickness $t_h$ of the layer 32, the thickness $t_1$ of the low index layer 31 is determined from:

$$t_1 = (0.5\lambda m - n_h t_h)/n_1 \qquad (5),$$

which equation results from equation (1) above.

However, if the last layer 21 of the standard multilayer is of low index, layer 21 is considered as a part of the low index layer 31; in this case, the contribution of layer 21 to the total round trip phaseshift of the layer pair 30 is essentially $\pi$ since layer 21 is essentially a $\lambda/4$ layer; therefore, in case layer 21 of the standard multilayer is of low index, the condition on $t_h$, $n_h$, $t_1$, $n_1$ for the preservation of the reflection characteristics of the standard multilayer 20 is:

$$n_1 t_1 = (2m-1)\lambda/4 - n_h t_h, \ m=2, \text{ or } 3, \qquad (6),$$

which equation results from equation (1') above.

Let $n_e$ the effective index of the dominant mode of the undesired polarization of the waveguide layer 32 with grating 40. The period $\Lambda$ of grating 40 essentially satisfies the synchronism condition $\Lambda = \lambda/n_e$ for the coupling of a free space wave at wavelength $\lambda$ (one wavelength within spectral bandwidth B) under normal incidence to the waveguide mode of effective index $n_e$. This coupling is wavelength tolerant since the request for a large $\alpha$ for efficient anomalous reflection gives rise to a wide resonance in the waveguide mode excitation according to the approximate expression $\Delta\lambda = \alpha\Lambda\lambda/\pi$ for the spectral width $\Delta\lambda$ of the anomalous reflection. This illustrates one of the advantages of the device according to the invention whereby this characteristics of wavelength tolerance permits its manufacturing without individual post-trimming.

The grating 40 can also be realized by photoinscription in the high index layer 32. In this case, $t_h = T_h/2$, and the waveguide thickness $T_h$ giving the largest radiation coefficient $\alpha$ is the known waveguide thickness of maximum field confinement from where $t_h$, $n_e$, then $t_1$, and finally $\Lambda$ can be derived.

The design procedure of a device according to the invention can be the following one.

A refractive index $n_h$ of layer 32 is chosen, preferably the same as the high index material involved in the multilayer mirror 20, but larger or significantly larger than $n_s$.

Then, the thickness of layer 32, and possibly its index $n_h$, as well as the grating depth d, are chosen so as to achieve a radiation coefficient $\alpha$ of at least 1/w of a grating placed at the interface between layer 32 and air. If d/$\Lambda$<15%, known analytical formulae based on the Rayleigh approximation can be used to calculate a as that given above for the TE modes. If d/$\Lambda$>15%, the designer will resort to available codes solving the diffraction problem exactly, like GSOLVER© from Grating Solver Development Company, Allen, Tex. 75002.

The thickness $n_1$ of layer 31 can then be deduced from the condition of essentially 2 m$\pi$ additional round trip phaseshift for a wave penetrating the pair of layers 30 from the multilayer mirror and reflected at the waveguide grating 40 when layer 21 is of high index (m=1, 2, 3), and essentially (2m-1)$\pi$., m=2, 3 . . . when layer 21 is of low index.

As an example of the device according to the invention, the polarizing grating of a Nd:YAG microchip laser emitting at $\lambda$=1.064 $\mu$m comprises a multilayer mirror 20 of 95% reflection using 11 layers of $Ta_2O_5$ (0.1217 $\mu$m thickness and 2.186 index) and $SiO_2$ (0.1795 $\mu$m thickness and 1.482 index), the first layer and the last layer being made of $Ta_2O_5$, deposited by ion plating, and a pair 30 of additional layers of $SiO_2$ and $Ta_2O_5$ with $t_1$=0.4 $\mu$m and $t_h$=0.25 $\mu$m, and a rectangular profile of period $\Lambda$=0.582 $\mu$m and depth d=0.13 $\mu$m ($T_h$ is 0.31 $\mu$m). The radiation coefficient $\alpha$ of the $TE_0$ mode is several tens of $\mu m^{-1}$ which is adequate to give rise to efficient abnormal reflection for beam diameters w larger than about 100 $\mu$m. It can be checked that the total phaseshift for a round trip within the pair of layers 30 is about 1.12 (4$\pi$). As another example, where the total phaseshift for a round trip in the pair of layers 30 is only essentially 2$\pi$, instead of 4$\pi$, and the last high index layer 32 is the same as in the first example, the last low index layer 31 giving the maximum $\alpha$ has $t_1$=0.04 $\mu$m.

A device according to the first embodiment damps a polarisation as illustrated on FIG. 1. Incident beam IB comprises two polarisations P1 and P2. P1 is reflected by the multilayer mirror 20 without being coupled by grating 40 into any mode of high index layer 32. When the device is a mirror of a laser device, P1 is thus the lasing beam 43 inside the laser cavity. P2 is also reflected by the multilayer mirror 20, but is coupled to waveguide or high index layer 32 by grating 40. As can be seen on FIG. 1, that part of beam P2 which is thus coupled returns back into the cavity with a phase shift of $\pi$. This explains why destructive interference in the multilayer damps this polarisation.

One example of a device according to the first embodiment was investigated in an open cavity scheme. A 1" Nd:YAG wafer of 500 mm thickness was coated at one side with a $SiO_2/Ta_2O_5$ multilayer system deposited by ion plating. The resulting refractive index at 1064 nm wavelength is 1.48 and 2.18 respectively. The multilayer comprises a set of 11 alternate $\lambda/4$ layers, starting with a $SiO_2$ layer at the wafer side. This standard multilayer was designed for a reflection coefficient of 94% at 1064 nm. A pair of $SiO_2/Ta_2O_5$ layers of essentially $\pi$ total optical thickness was added at the air side as the polarising pair. This decreases the reflection coefficient to 90%.

The high index layers of the multilayer can be considered as a waveguide. The dominant $TE_0$ mode is however mainly concentrated in the thicker last high index layer. The effective index $n_e$ of the dominant $TE_0$ mode of the multilayer mirror was measured at 1064 nm by mean of the prism coupling technique with a Nd:YAG laser. The period $\Lambda$ of the corrugation grating aimed at coupling the emitted TE polarisation to the $TE_0$ mode was deduced from $\Lambda = \lambda/n_e$ corresponding to waveguide coupling under normal incidence. The grating depth into the last $Ta_2O_5$ layer needed to achieve a high radiation coefficient was determined by means of a multilayer grating code based on a generalised source method as explained in the article of A. V. Tishchenko, 'A generalised source method for wave propagation', Pure Appl. Opt., Vol. 7, 1998, pp. 1425–1449 or in the article by the same author 'A generalized source method: new possibilities for waveguide and grating problems', in Optical and Quantum Electronics, vol.32, pp. 971–980, 2000.

The grating of 1 mm$^2$ area was obtained by direct writing in a e-beam resist by means of a LION LV1 lithography system followed by Reactive Ion Beam Etching at a depth of 140 nm. This raises the reflection coefficient of the desired TM polarisation to 95%. The choice of this nominal reflection coefficient is by no means the result of an optimised laser design. It was just taken as a benchmark. CW laser would usually require a significantly larger reflection coefficient whereas pulsed lasers would operate with a lower reflection.

The corrugated part of the Nd:YAG microlaser mirror was tested in a characterisation experiment comprising the stabilised and collimated white light source of a spectrometer.

The beam falls normally onto the YAG wafer through a 1 mm² square hole made in an opaque sheet. A beam splitter redirects the reflected beam to the entrance slit of a monochromator equipped with a 600 l/mm grating. The signal was detected by a germanium photo-detector operating at 77° K in combination with a computer controlled counting system. The incident polarisation can be set to TE (electric field parallel to the grating lines) or to TM by means of a polariser placed before the YAG wafer.

Figure 3:
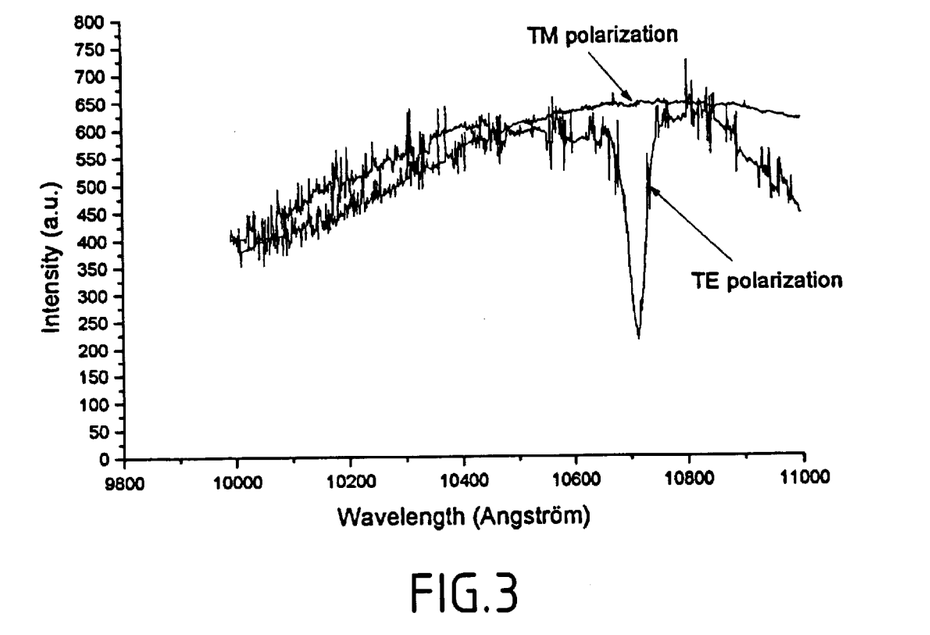
FIG. 3 and 4 are experimental results obtained with a device according to the invention.

FIG. 3 presents the experimental results for the reflection of the polarising mirror under normal incidence versus wavelength in arbitrary units of optical power. The reflection difference maximum is found very close to 1.064 mm which is the wavelength of a Nd:YAG microchip laser. The dip in the TE curve is the evidence of the desired polarising effect. The TM curve is continuous over the whole wavelength range. This confirms that the grating k-vector does not couple the incident TM polarisation to any TM guided mode of the multilayer mirror, and is large enough to prevent any propagating TM diffraction order in the air and in the YAG substrate of index 1.82. The TE dip is rather wide as an effect of the strength of the radiation coefficient $\alpha$, showing that the polarisation filtering effect is possibly wide band and can for instance be used to polarise all the modes of a multi-longitudinal modes higher power microchip laser having a longer cavity. The depth of the reflection dip is of the order of 50% of the TE amplitude. This is more than necessary in the present case and can still be optimised. The depth needed to efficiently prevent the lasing of the TE polarisation depends on the mirror reflection coefficient:the larger the reflection coefficient, the shallower the TE reflection dip has to be. Quantitative recommendations concerning the needed depth of the dip can however not be made at this preliminary stage since the effect of scattering was very low and could not be estimated with sufficient accuracy.

In order to assess the polarising function of the grating mirror as a laser functional element, the microchip cavity was then closed at the pump side. The same wafer Nd:YAG was butted against a glass wafer coated on one side with a multilayer mirror exhibiting 99% reflection at 1064 nm and 94% transmission at the pump wavelength of 807 nm. The other side has no anti-reflection coating. Good optical contact between the YAG wafer and the mirror plate was obtained by means of an index matching thin film of Glycerol. The optical pumping is provided by a multimode pigtailed semiconductor laser delivering a pump power of up to 5 Watt. A lens focuses a fibre output into the microchip laser assembly. No particular care was taken to optimise the excitation conditions.

Figure 4:
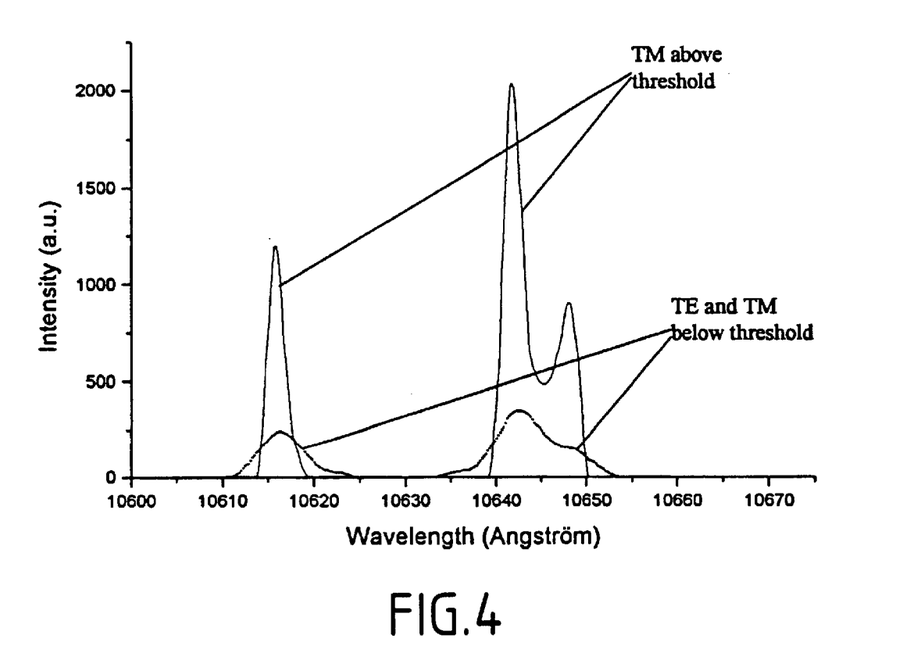

FIG. 4 shows the spectrum emitted by the pumped assembly versus wavelength for two values of the pump power. The dashed curve corresponds to a super-radiant emission. The ratio between TE and TM emission is close to 1. The solid line corresponds to a pump level above threshold. Two peaks can be distinguished within the gain curve. The ratio between the TE and TM polarisations is below -17 dB. This clearly demonstrates that a grating can be the integrated element which stabilises the polarisation state of a solid state microchip laser. No precise scattering measurement could be performed at that stage. However, systematic measurements of the type of FIG. 4 tend to indicate that the scattering level on the desired TM polarisation is much below 1%. This is expectable since the diffractive structure is not right in the laser cavity where the field is maximum. Furthermore, it is likely that an optimised structure will require a grating depth shallower than the existing 140 nm, giving therefore rise to an even lower scattering.

It is thus shown that, according to the invention, a grating associated with the multilayer mirror of a laser can be made to dictate the polarisation of the emission. This allows the manufacturing of polarisation stabilised microchip lasers to be fully achieved by low cost planar technologies. This technique can be applied to pulsed as well as to CW lasers.

The first embodiment of the invention can thus be used at one side of a laser cavity. A laser device further comprises pumping means, like a semiconductor diode for a microchip laser, or an array of semiconductor lasers in solid state lasers.

The invention applies as well to the polarisation control of gas lasers. A device according to the invention, in the form of a single reflection/polarising element as disclosed above, can be used in a gas laser in replacement of the intra-cavity Brewster element.

Figure 5:
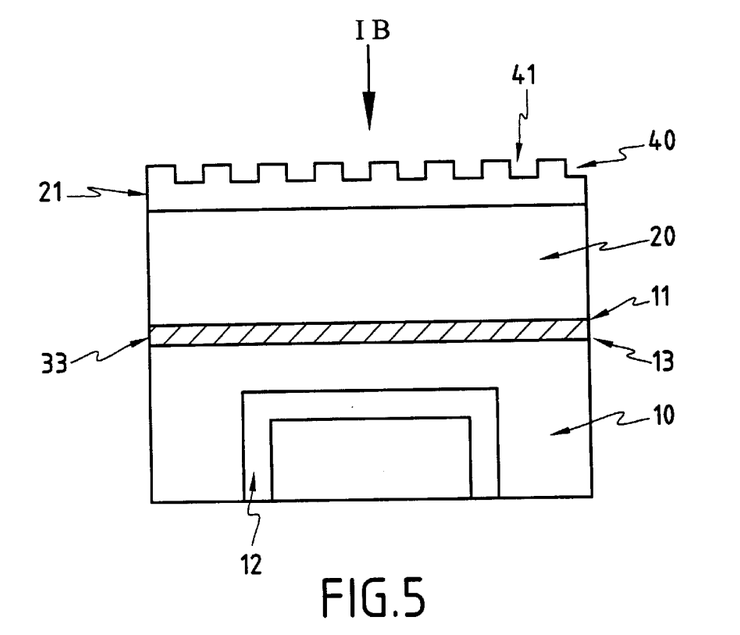
FIG. 5 is the cross-section view normal to the grating lines of the second embodiment of the device according to the invention.

FIG. 5 is the cross-section view of a second embodiment of optical coupling means according to the invention.

The incidence of the beam IB of spectral width B, is only from the air side.

The device is composed of a substrate 10, a multilayer 20, a grating 40 in the last layer 21 of the dielectric multilayer 20.

The substrate can be composed of a metal of complex relative permittivity $\epsilon_m$; the metal substrate possibly contains cooling means 12.

Alternatively, the substrate can be made of a solid material coated with a metal film 33 of thickness $t_m$ and complex permittivity $\epsilon_m$. The dielectric mutilayer 20, bordered by air at one side and by the metal 11 at the other side, represents a waveguide which can propagate guided modes of both TE and TM polarizations along a direction parallel to the plane 11.

These modes are transverse resonances of the electromagnetic field. For the same multilayer 20, their number is more than the double of the number of the modes propagating in a structure of the state of the art as disclosed in the article of Bel'tyugov cited above.

These modes also have an effective index $n_e$ which in the present embodiment can have values between 1 and close to $n_h$ (instead of between $n_s$ and close to $n_h$ in a structure of the state of the art).

The effective index of the TE and of the TM modes are interleaved. Furthermore, they experience absorption losses since the modal field "sees" the metal boundary. The TM polarised modes experience a significantly larger attenuation than the TE modes. There are also two TM modes, called surface plasmon modes, which do not have their TE counterparts; these are lossy collective electron oscillation propagating along the metal 11 and along the lower 13 of the metallic film.

As a result of the metal absorption, the linewidth $\Delta\lambda$ of the mode resonance experiences a broadening. This means that the polarizing function can be executed with large tolerances over a rather broad wavelength range.

One can characterize the metal absorption effect on the coupled TM mode by the field absorption coefficient $\alpha_a$ of the said TM guided mode, and the radiation coefficient of the chosen TM mode in presence of the grating by the field radiation coefficient $\alpha$. The best conditions for a transfer of energy from the incident TM incident polarization to the chosen TM guided mode correspond to $\alpha_a$ being essentially equal to $\alpha$.

In such preferred situation, the wavelength linewidth $\Delta\lambda$ expresses as $\Delta\lambda=\alpha\lambda\Lambda/\pi$. In a preferred embodiment, the polarization of the incident beam IB to be filtered out is the TM polarization with the electric field directed orthogonally to the grating grooves 41. The period $\Lambda$ of grating 40 is adjusted so as to satisfy the coupling synchronism condition $\Lambda=\lambda_0/n_e$ where $\lambda_0$ is the central wavelength of the linewidth (within spectral bandwidth B) of the selected propagating TM mode and $n_e$ is the effective index of the said selected TM mode at wavelength $\lambda_0$. The selected TM mode is chosen for example on the basis of the following criteria: first, its attenuation due to the metallic border is large; secondly, there should be no TE near neighbour mode, i.e., $\lambda_0$ is notably outside the linewidth of any neighbouring TE mode. Such conditions are easy to satisfy by using one of the commercially available grating computer codes, for example the GSOLVER software already cited above. The same code will give the depth of grating 40 leading to the requested decrease of the reflection coefficient of the damped polarization.

As an example of the second embodiment applied to the case of a laser mirror, the substrate 10 is made of aluminum of complex permittivity $\epsilon_m=(-235, 42.5)$ at $\lambda_0=1064$ nm. The multilayer comprizes 23 layers identical to those of the first embodiment of the invention. The grating 40 of period $\Lambda=0.768$ nm and depth 100 nm realized in the last high index layer 21 of initial thickness 127 nm couples the TM polarization of the normally incident beam IB to the TM mode of effective index $n_e=1.38542$. The nearest TE modes have effective indices of 1.33384 and 1.44703. The resulting reflection coefficients are 99.8% for the TE polarization and 6.1% for the TM polarization at $\lambda_0=1064$ nm. The linewidth over which the TM reflection coefficient is smaller than 90% is 3.7 nm, i.e., larger than the gain bandwidth in Nd:YAG. This also means for instance that the tolerance of the low layer index is 0.005 and that on the high layer index is 0.01.

These tolerances on the low and high index are within reach for most dielectric deposition technologies.

A device according to the second embodiment of the invention can be used as one of the mirrors of a laser cavity, the other mirror being a standard multilayer mirror. Such a laser cavity thus comprises an active medium, and two ends mirrors, one of which having the structure disclosed in relation to FIG. 5. A laser device further comprises pumping means, like a semiconductor diode for a microchip laser, or an array of semiconductor lasers for solid state lasers.

Figure 6:
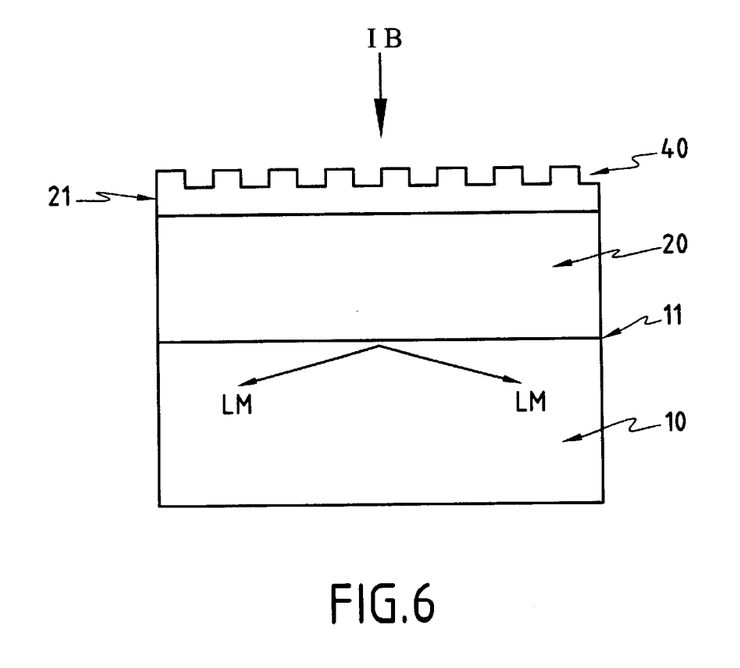
FIG. 6 is the cross-section view normal to the grating lines of the third embodiment of the device according to the invention.

FIG. 6 is the cross-section of a third embodiment of a device or of optical coupling means according to the invention.

The incidence of the beam IB (of spectral bandwidth B) is from the air side.

The device according to this embodiment is composed of a dielectric substrate 10, a multilayer 20, a grating 40 in the last layer 21 of the multilayer 20.

The grating period $\Lambda$ is adjusted so as to achieve the coupling of one of the polarizations of the incident beam IB to one of the first order leaky modes of the same polarization of the multilayer 20 and the substrate 10.

In this embodiment the substrate 10 represents an optical power sink for the leaky mode excited by grating 40 of period $\Lambda=\lambda_0/n_e$ where $n_e$ is the effective index of the chosen leaky mode. $\lambda_0$ is one wavelength within bandwidth B.

The leaky TM and TE modes also have an effective index $n_e$ which can have values between 1 and $n_s$ instead of between $n_s$ and $n_h$ in a structure of the state of the art. The effective index of the TE and TM leaky modes are also interleaved.

The power leakage occurs in the form of two symmetrical beams LM propagating through the interface 11 between the multilayer 20 and the substrate 10 under a grazing angle. The linewidth $\Delta\lambda$ of a leaky mode is significantly broader than that of a true guided mode because the standing wave in the multilayer is accompanied by a power leak, associated with partial reflection at the interface 11.

Therefore this embodiment is also broadband and is tolerant on the manufacturing conditions of the multilayer 20. One can characterize the leakage effect on the coupled TM or TE mode by the field leakage coefficient $\alpha_1$ of the said TM or TE guided mode and the radiation coefficient of the chosen TM or TE mode in presence of the grating by the field radiation coefficient $\alpha$.

The best conditions for a transfer of energy from the incident TM or TE polarization to the chosen TM or TE leaky mode correspond to $\alpha_1$ being essentially equal to $\alpha$.

In such preferred situation, the wavelength linewidth $\Delta\lambda$ expresses as $\Delta\lambda=\alpha\lambda_0\Lambda/\pi$.

Given the standard multilayer of a laser mirror or of a coupler, a calculation by means of an available code identifies which is the polarization of the first dominant leaky mode, leading to the least leakage of the second dominant mode of the orthogonal polarization. One can refer for example to R. Ulrich et al. Appl. Phys., Vol.1, No.55, 1973.

The grating period and depth can be adapted to more efficiently couple the corresponding incident polarization of beam IB to the said first dominant leaky mode.

As an example of the third embodiment applied to the case of a laser mirror, the substrate is made of quartz, $n_s=1.45$. The multilayer is identical to that of the example of the second embodiment of the coupling means. The grating period $\Lambda=747$ nm and depth 70 nm realized in the last high index layer 21 of initial thickness 127 nm couples the TE polarization to the TE dominant leaky mode of effective index $n_e=1.42436$.

The effective index of the dominant mode of the orthogonal polarization is 1.40129. The resulting reflection coefficients are 73.2% and 99.1% for the TE and TM polarization respectively. The linewidth over which the TE reflection coefficient is smaller than 90% is 7.6 nm, i.e. larger than the gain bandwidth in Nd:YAG.

This corresponds to a tolerance of 0.01 on the low and high multilayer refractive index. These tolerances are also within reach for most dielectric multilayer deposition technologies.

A device according to the third embodiment of the invention can be used as one of the mirrors of a laser cavity, the other mirror being a standard multilayer mirror. Such a laser cavity thus comprises an active medium, and two end mirrors, one of which having the structure disclosed in relation to FIG. 6. A laser device further comprises pumping means, like a semiconductor diode for a microchip laser.

Figure 7:
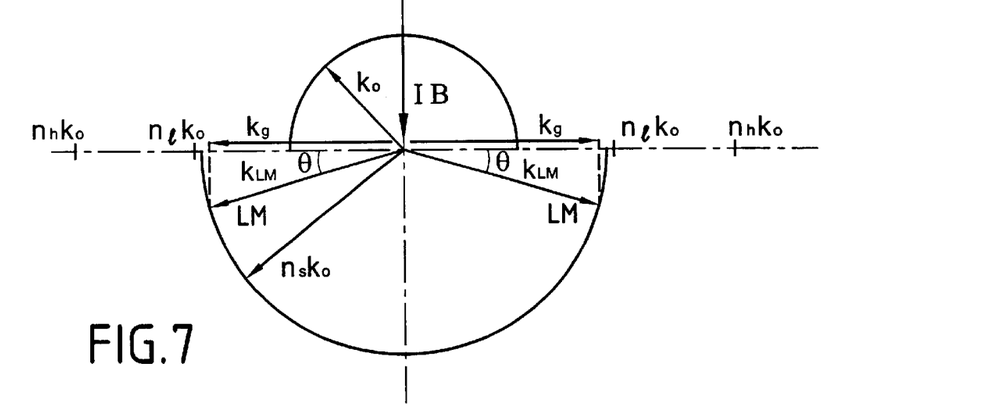
FIG. 7 is the spatial frequency diagram of the case of the third embodiment of the device according to the invention.

FIG. 7 is the spatial frequency diagram of the third embodiment of the invention. The grating 40 of grating constant $K_g=2\pi/\Lambda$ couples one polarization of the normally incident beam IB to a leaky mode of the multilayer 20 and substrate 10 represented by a spatial frequency vector $k_{LM}$ making a grazing angle $\theta$ with the interface 11.

Figure 8A:
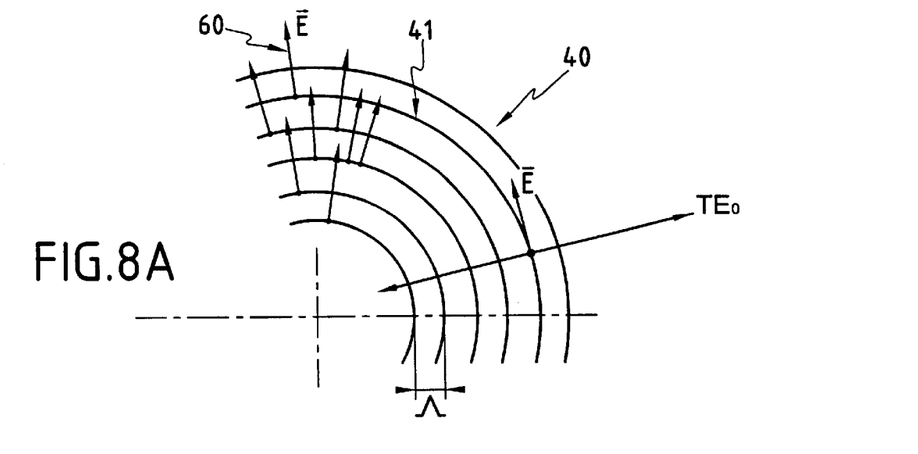
FIGS. 8a) and b) is the plane view of a grating device according to the invention providing a radial and an azimuthal distribution of the polarization.
Figure 8B:
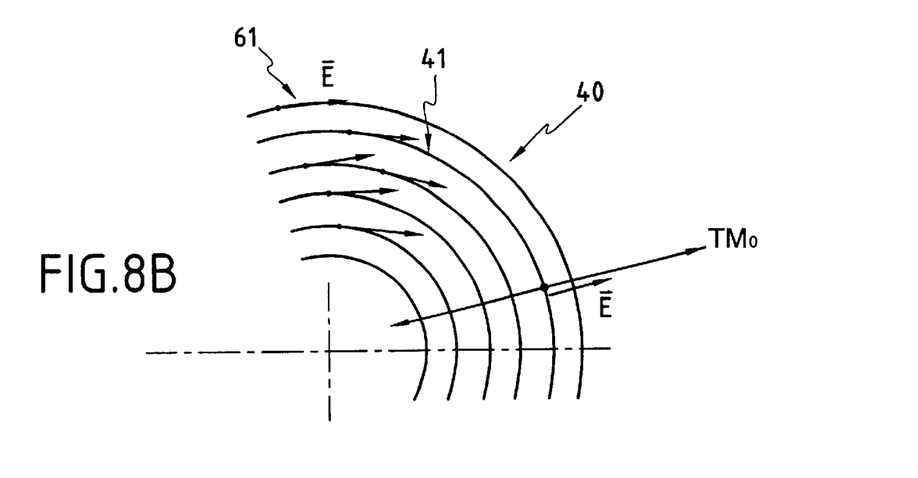

FIG. 8 is the plane view of a particular arrangement of the grooves 41 of grating 40 according to any of the three embodiments disclosed above.

Grating lines 41 of grating 40 are azimuthally distributed.

In FIG. 8a) grating 40 induces a damping of the reflection for a locally azimuthal polarization of the electric field by coupling it to the $TE_0$ mode of grating waveguide 32 according to the first embodiment of the coupling means, or to a lossy TE mode of the multilayer 20 according to the second embodiment, or to a TE leaky mode according to the third embodiment.

The polarization distribution of the electric field which experiences no reflection damping is the radial polarization distribution 60.

When placed in a laser resonator, this mirror gives rise to an emitted beam which has a radial polarization distribution of the electric field.

In FIG. 8b) grating 40 of same pattern as in FIG. 8a), but of different period, induces a damping of the reflection for a locally radial polarization of the electric field by coupling it to the $TM_0$ mode of grating waveguide 32 according to the first embodiment of the coupling means, or to a TM mode of the multilayer 20 according to the second embodiment, or to a TM leaky mode according to the third embodiment. The polarization distribution of the electric field which experiences no reflection damping is the azimuthal distribution 61.

In the first embodiment of the coupling means the effective index $n_e$ of the $TM_0$ mode is made larger than the substrate index $n_s$ by suitably choosing the index and thickness of layer 32. Other polarization distributions of the light emitted by a laser can be obtained by suitably distributing the grating lines as long as the polarization distribution essentially corresponds to a transverse mode of the laser resonator.

Figure 9:
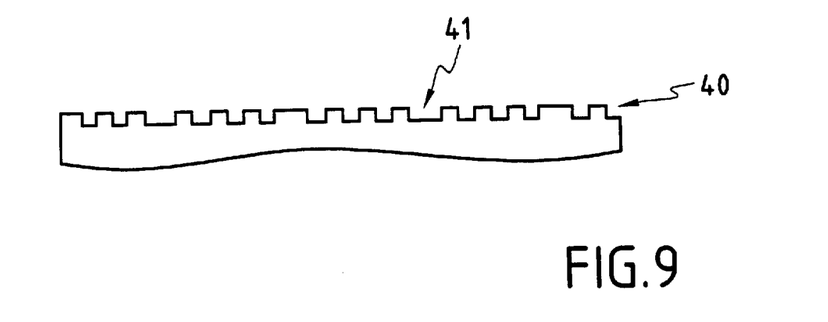
FIG. 9 is the cross-section view of a grating device according to the invention providing a polarization selection at two emission wavelengths.

FIG. 9 is the cross-section view of a device according to any of the embodiments of the invention, accomplishing the polarizing function at, and in the neighborhood, of two wavelengths $\lambda_1$ and $\lambda_2$.

The spatial frequency spectrum of grating 40 contains two spatial frequencies, $K_{g1}$, and $K_{g2}$, each corresponding to the coupling of one different incident wavelength into the same mode of the optical coupling means with two different effective index $n_{e1}$ and $ne_2$ at the two different wavelengths.

This can be realized by digitizing in a binary format the product of a sinusoidal function of high spatial frequency $(K_{g1}+K_{g2})/2$ by a cosine function of low spatial frequency $(K_{g1}-K_{g2})/2$, $K_{g1}$ satisfying $K_{g1}=2\pi n_{e1}/\lambda_1$, $K_{g2}$ satisfying $K_{g2}=2\pi n_{e2}/\lambda_2$. In the particular case of the first embodiment of the coupling means, $\lambda_1$ and $\lambda_2$ are preferentially not too far apart so that the 2 m$\pi$ condition on the total phaseshift in the pair of layers 30 is still approximately satisfied for both wavelengths.

Figure 10:
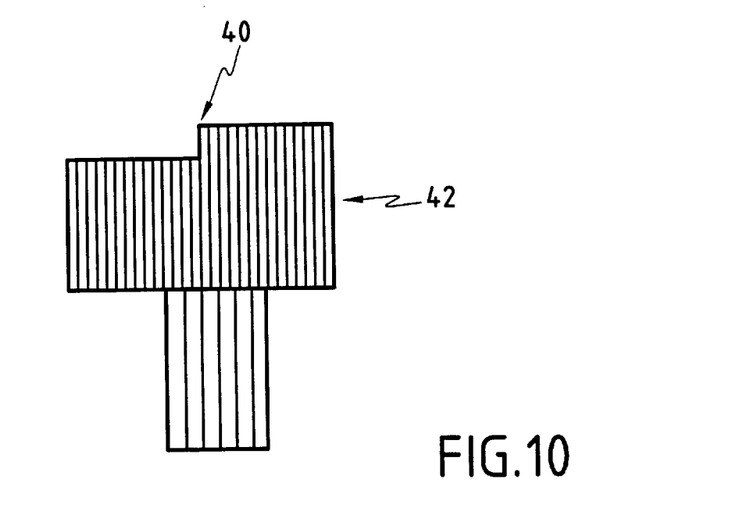
FIG. 10 is the plane view of a grating device according to the invention providing a polarization selection at more than two wavelengths.

FIG. 10 is the plane view of the device according to any of the embodiments of the invention whereby contiguous spatially multiplexed grating areas 42 of different spatial frequency induce a polarization damping at different wavelengths which match with the emission spectrum of a gas laser for instance. There is no need that one single polarization selective grating area covers the whole incident wave cross-section. It suffices that there is sufficient polarization damping for the damped polarization of the concerned laser resonator mode. There is the need for contiguous grating areas in order to avoid phase front jumps in the wave front of the emitted waves. Again, in the first embodiment of the coupling means, the different wavelengths are preferably not too far apart so that the 2 m$\pi$ total phaseshift condition through layer 32 is essentially fulfilled for all wavelengths.

Figure 11:
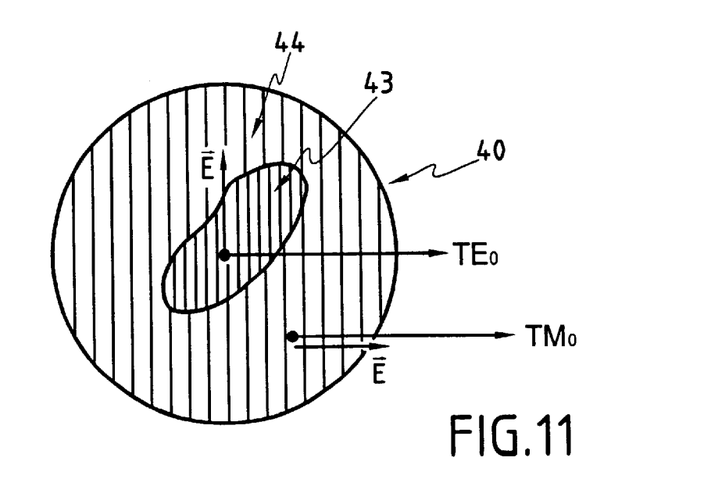
FIG. 11 is the plane view of a device according to the invention providing cross-polarized emission at two wavelengths.

FIG. 11 is the plane view of the device according to any embodiment of the invention comprising two grating areas 43 and 44 of parallel orientation and different periods $\Lambda_1$ and $\Lambda_2$ respectively. Grating area 43 with grating period $\Lambda_1$ couples the normally incident free space wave of electric field polarization parallel to the grating lines at wavelength $\lambda_1$ to a TE of the coupling means having effective index $n_{e1}$ at wavelength $\lambda_1$ satisfying $\Lambda_1=\lambda_1/n_{e1}$. Grating area 43 with grating period $\Lambda_2$ couples the normally incident free space wave of electric field polarization perpendicular to the grating lines at wavelength $\lambda_2$ to a TM mode of effective index $n_{e2}$ at wavelength $\lambda_2$ satisfying $\Lambda_2=\lambda_2/n_{e2}$. In the first embodiment of the coupling means, the index and thickness of layer 32 are preferably such that $n_{e2}>n_s$. A laser having two emission lines at $\lambda_1$ and $\lambda_2$, or having a gain bandwidth containing $\lambda_1$ and $\lambda_2$, emits $\lambda_1$ with a polarization of the electric field perpendicular to the grating lines, and $\lambda_2$ with the polarization of the electric field parallel to the grating lines.

Figure 12:
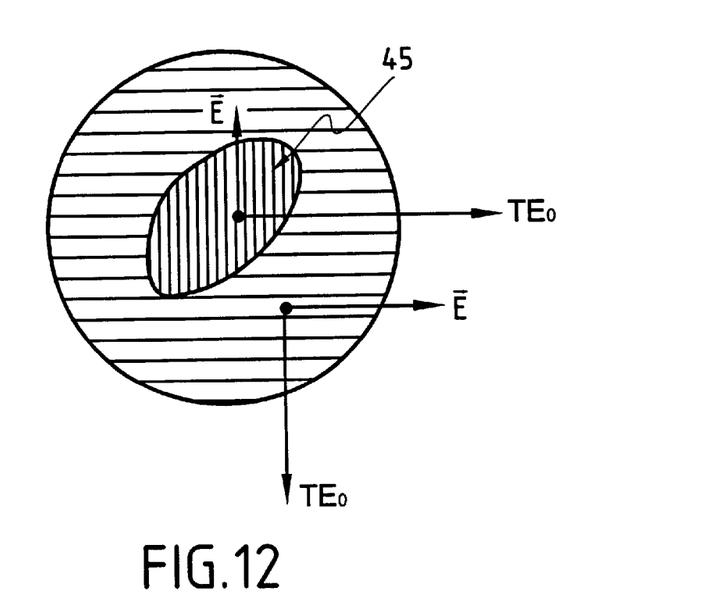
FIG. 12 is the plane view of another device providing cross-polarized emission at two wavelengths.

FIG. 12 is the plane view of a device according to any of the embodiments of the invention comprising two grating areas 45 and 46 of perpendicular line orientation and different periods $\Lambda_1$ and $\Lambda_2$. Grating area 45 with grating period $\Lambda_1$ couples the normally incident free space wave at wavelength $\lambda_1$ of electric field polarization parallel to the grooves of grating area 45 to a TE mode of the coupling means of effective index $n_{e1}$ satisfying $\Lambda_1=\lambda_1/n_{e1}$. Grating area 46 with grating period $\Lambda_2$ couples the normally incident free space wave at wavelength $\lambda_2$ of electric field polarization parallel to the grooves of grating area 46 to a TE mode of effective index $n_{e2}$ satisfying $\Lambda_2=\lambda_2/n_{e2}$. A laser having two emission lines at $\lambda_1$ and $\lambda_2$, or having a gain bandwidth containing $\lambda_1$ and $\lambda_2$, emits $\lambda_1$ with a polarization of the electric field perpendicular to the grating lines of grating area 45, and $\lambda_2$ with the polarization of the electric field perpendicular to the grating lines of grating area 46.

Figure 13:
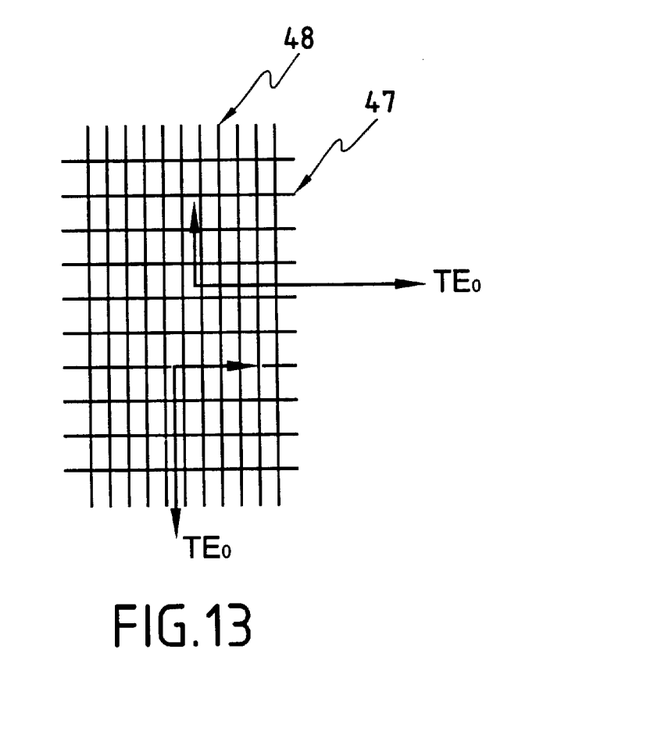
FIG. 13 is the plane view of another device providing cross-polarized emission at two wavelengths.

FIG. 13 is the plane view of another device according to the three embodiments of the coupling means comprising two orthogonally crossed gratings 47 and 48 of periods $\Lambda_1$ and $\Lambda_2$. Grating 47 couples the polarization of the normally incident free space wave of wavelength $\lambda_1$ parallel to the lines of grating 47 to a TE mode of the coupling means of effective index $n_{e1}$ at wavelength $\lambda_1$. $\Lambda_1$ satisfies the matching condition $\Lambda_1=\lambda_1/n_{e1}$. Grating 48 couples the polarization of the normally incident free space wave of wavelength $\lambda_2$ parallel to the lines of the grating 48 to a TE mode of effective index $n_{e2}$ at wavelength $\lambda_2$. $\Lambda_2$ satisfies the matching condition $\Lambda_2=\lambda_2/n_{e2}$. To prevent any diffraction loss of the incident free space wave into the substrate 10 in the case of the first embodiment, the effective index $n_{e1}$ at wavelength $\lambda_1$ and $n_{e2}$ at wavelength $\lambda_2$ preferably satisfy the relationship $((n_{e1}/\lambda_1)^2+(n_{e2}/\lambda_2)^2)^{1/2}<n_s/\min(\lambda_1,\lambda_2)$.

Figure 14:
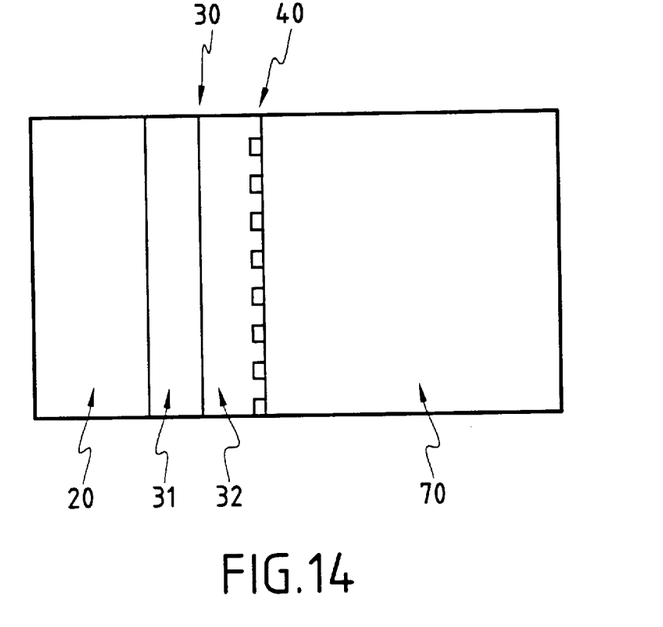
FIG. 14 is the cross-section view of a device according to the invention for gas lasers.

FIG. 14 is the cross-section view of another configuration of the first embodiment for gas lasers. If the presence of the transparent substrate with an antireflection multilayer within the gas laser cavity at the side of the gas column is undesired, the device according to the invention can be placed at the side of the gas column as illustrated in FIG. 14. Direct wafer bonding or anodic bonding is used to perform the adhesion of the gas laser window 70 with the multilayer with the additional pair of layers 30 supported by a provisional substrate 10. After adhesion between the laser window and the layer 32 with grating 40, the substrate 10 is removed by selective wet etching or by means of a smart cut technique. This allows to avoid detrimental scattering due to the presence of the corrugation within the laser cavity.

Figure 15:
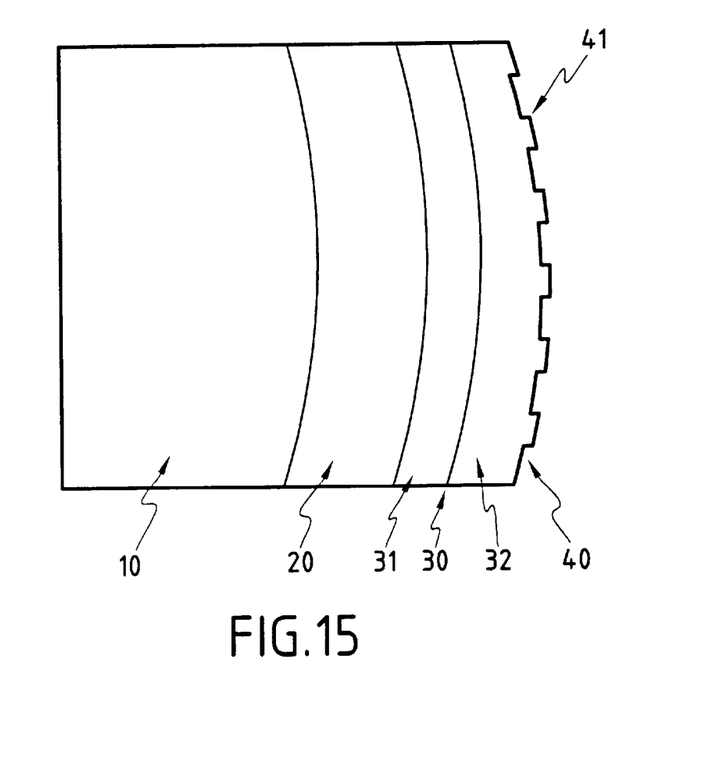
FIG. 15 is the cross-section view of a device according to the invention on a curved substrate.

FIG. 15 is represents another structure of the device according to any embodiment of the invention involving a curved substrate 10 and representing the focusing mirror or coupler of a stable laser resonator. The cross-section view is here shown only for the first embodiment of the coupling means. The standard multilayer 20 is similarly coated with the pair 30 of layers 31 and 32. Depending on the radius of curvature, the grating 40 can either have a constant period or have a groove period $\Lambda$ which varies so as to couple the non-collimated incident wave belonging to a laser resonator mode to a defined mode of layer 32 over the whole cross-section.

The device according to the present invention comprises a substrate, a multilayer mirror, and coupling means comprising a corrugation grating. The grating is located in the last layer of the mulilayer (second and third embodiments) or in (or on) the last high index layer (first embodiment).

It appears from the above that the invention concerns coupling means made of a corrugation grating and a substructure of the device (the last high and low index layers in the first embodiment, the metal or dielectric substrate in the other embodiments) whereby the coupling of the incident laser beam of one polarization into a mode of the said substructure results in the decrease, for example by at least 10%, of the multilayer reflection coefficient of the said polarization over a large optical wavelength range. The mentioned figure of 10% is only indicative. The requested decrease of the reflection coefficient depends on the laser operation (CW or pulsed regime) and on the gain of the active medium. Those familiar to the art of lasers will easily state the necessary reflection coefficients leading to the desired polarization filtering.

Multilayer mirrors closing a laser cavity can broadly be of two categories. The multilayer is called a "mirror" if its function is to reflect close to 100% of the incident energy into the cavity. It is called a "coupler" if its function is to partially reflect and partially transmit the laser beam. A device according to the invention can be of one or the other category, as appears clearly from the above description.

The polarization states are said transverse magnetic (TM) if the electric field is in a plane normal to the grating lines and transverse electric (TE) if the electric field is parallel to the grating lines.

The above descriptions give only examples of embodiments of the device according to the invention. A number of other embodiments will be easily designed by those familiar to the art in the light of the present disclosure.

What is claimed is:

1. An optical device comprising a substrate, a multilayer mirror, a pair of low and high refractive index layers disposed on said multilayer mirror, and a diffraction grating in said high refractive index layer, said grating having a period adjusted so as to achieve coupling of one of the polarizations of an incident beam to a mode of said high refractive index layer.

2. A device according to claim 1, the thickness and index of the pair of low and high index layers being such that the additional optical path resulting from this pair of layers provides a total round trip additional optical phase equal to an integer number of essentially $2\pi$ at a wavelength of operation $\lambda$.

3. A device according to claim 1, the index $n_h$ and the thickness $t_h$ of the high refractive index layer being such that the effective index $n_e$ of the mode of the high refractive index layer to which an undesired polarization is coupled is larger than the index $n_s$ of said substrate.

4. A device as in claim 1, the following condition in the spatial frequency domain being fulfilled:

$$K_g = n_e k_0 \quad (2),$$

where $K_g = 2\pi/\Lambda$ is the grating spatial frequency, $k_0 = 2\pi/\lambda$ is the spatial frequency of a free space wave in vacuum, and $n_e$ is the effective index of a mode of the high index layer.

5. A device according to claim 1, the product of the field radiation coefficient $\alpha$ by an incident beam diameter w, $\alpha$w, being larger than 1.

6. A device according to claim 1, the grating being a rectangular grating of depth d of line/space ratio 1:1, d being such that:

$$s = 0.5(4d/\pi),$$

where s is the amplitude of the first harmonics in the Fourier series of the grating profile.

7. A device according to claim 1, the grating being a rectangular grating of depth d such that:

$d=(2s)\pi/4$, where s is the amplitude of the first harmonics in the Fourier series of the grating profile;

and $t_{eff}$ is the known effective thickness of a mode given by $t_{eff} = t_h + 1/(k_0(n_e^2-n_1^2)^{1/2}) + 1/(k_0(n_e^2-1)^{1/2})$, where:

$k_0 = 2\pi/\lambda$ is the spatial frequency of a free space wave in vacuum, $t_h$ is the thickness of the last high index layer, and the index $n_e$ and $n_1$ are, respectively, the effective index of said mode in the high index layer for said mode, and the index of the low index layer.

8. A device according to claim 1, said multilayer mirror comprising alternate layers of a low index material and a high index material, said pair of low and high refractive index layers being made of materials respectively identical to said low index material and high index material of said multilayer mirror.

9. A device according to claim 1, said pair of low and high refractive index layers being respectively made of $SiO_2$ and $Ta_2O_5$.

10. A device as in claim 1, said multilayer mirror being located between said substrate and said pair of low and high refractive index layers.

11. A device according to claim 1, said substrate being a laser active material.

12. A device according to claim 11, said laser active material being a Nd:YAG laser material.

13. A device according to claim 1, said substrate being an amorphous material.

14. A device according to claim 1, said substrate being a birefringent crystal.

15. An optical device as in claim 1, said substrate being the window of a laser further comprising a gas column, said multilayer mirror being turned toward said gas column and said high index layer and said grating being turned towards said substrate.

16. A laser mirror comprising a metal substrate or a substrate coated with a metal film, a multilayer mirror, and a diffraction grating, said multilayer mirror being located between said substrate, or said film, and said grating, said grating having a period adjusted so as to achieve coupling of one of the polarizations of an incident beam to a mode of said multilayer mirror.

17. A laser mirror according to claim 16, further comprising cooling means disposed inside the substrate.

18. A mirror as in claim 16, said multilayer mirror and said substrate having at least one guided mode of field absorption coefficient $\alpha_a$, said mode having a field radiation coefficient of $\alpha$ in the presence of said grating which is equal or essentially equal to said field absorption coefficient.

19. A mirror as in claim 16, the period $\Lambda$ of the grating being adjusted so as to satisfy the coupling synchronism condition $\Lambda = \lambda_0/n_e$ where $\lambda_0$ is the central wavelength of the linewidth of a propagating mode of said multilayer mirror, and $n_e$ is the effective index of said propagating mode at wave length $\lambda_0$ in the multilayer.

20. An optical device comprising a dielectric substrate, a multilayer mirror, and a diffracting grating, said multilayer mirror being located between said substrate and said grating, said grating having a period adjusted so as to achieve coupling of one of the polarizations of an incident beam to one of the first order leaky modes of the same polarization of the multilayer and the substrate.

21. A device as in claim 20, said multilayer and said substrate having at least one leaky mode of field leakage coefficient $\alpha_1$ and of field radiation coefficient $\alpha$ in presence of the grating, $\alpha$ being equal or essentially equal to $\alpha_1$.

22. A device as in claim 20, wherein said grating has a period $\Lambda=\lambda_0/n_e$ where $\lambda_0$ is the vacuum wavelength of an incident beam and $n_e$ is the effective index of a leaky mode.

23. An optical device as in claim 1, said substrate being curved and forming the focusing mirror of a stable laser resonator.

24. An optical device as in claim 1, the grating comprising grating lines which are azimuthally distributed.

25. An optical device as in claim 1, the grating having a spatial frequency spectrum which contains two spatial frequencies, Kg1 and Kg2, each corresponding to the coupling of one incident wavelength into the same mode of the grating waveguide formed by the high refractive index layer and the diffraction grating.

26. An optical device as in claim 1, said grating comprising contiguous spatially multiplexed grating areas.

27. An optical device as in claim 1, said grating comprising two grating areas of parallel orientation and different periods.

28. An optical device as in claim 1, said grating comprising two grating areas of orthogonal orientation and different periods.

29. A microchip laser comprising an active solid medium, a first and a second mirrors, one of said first and second mirrors comprising a device according to claim 1.

30. A method of damping a first polarisation of an incident light comprising a first and a second polarisation components, said method comprising directing said beam of light toward an optical device, comprising a substrate, a multilayer mirror, a pair of low and high refractive index layers disposed on said multilayer mirror, and a diffraction grating in said high refractive index layer, whereby said first polarisation is coupled into a mode of said last index layer and is reflected back from the grating with a phaseshift of $\pi$.

31. A method of damping a first polarisation of an incident light comprising a first and a second polarisation components, said method comprising directing said beam of light toward an optical device according to claim 1.

32. A method of damping a first polarisation of an incident light comprising a first and a second polarisation components, said method comprising directing said beam of light toward an optical device, comprising a metal substrate or a substrate coated with a metal film, a multilayer mirror, and a diffraction grating, said multilayer mirror being located between said substrate, or said film, and said grating, whereby said first polarisation is coupled into a mode of said multilayer and said substrate.

33. A method as in claim 31, said mode to which said first polarisation is coupled being a guided TM mode.

34. A method of damping a first polarisation of an incident light comprising a first and a second polarisation components, said method comprising directing said beam of light toward an optical device, comprising a dielectric substrate, a multilayer mirror, and a diffraction grating, said multilayer mirror being located between said substrate and said grating, whereby said first polarisation is coupled to one leaky mode of same polarisation of said multilayer and said substrate.

35. A device according to claim 2,
the index $n_h$ and the thickness $t_h$ of the high refractive index layer being such that the effective index $n_e$ of the mode of the high refractive index layer to which an undesired polarization is coupled is larger than the index $n_s$ of said substrate;
the following condition in the spatial frequency domain being fulfilled:

$$K_g = n_e k_0 \quad (2),$$

where $K_g = 2\pi/\Lambda$ is the grating spatial frequency, $k_0 = 2\pi/\lambda$ is the spatial frequency of a free space wave in vacuum, and $n_e$ is the effective index of a mode of the high index layer;
the product of the field radiation coefficient $\alpha$ by an incident beam diameter w, $\alpha$w, being larger than 1;
the grating being a rectangular grating of depth d of line/space ratio 1:1, d being such that:

$$s=0.5(4d/\pi),$$

where s is the amplitude of the first harmonics in the Fourier series of the grating profile;
the grating being a rectangular grating of depth d such that:
$d=(2s)\pi/4$, where s is the amplitude of the first harmonics in the Fourier series of the grating profile;
and $t_{\it eff}$ is the known effective thickness of a mode given by $t_{\it eff}=t_h+1/(k_0(n_e^2-n_1^2)^{1/2}) +1/(k_0(n_e^2-1)^{1/2})$, where:
$k_0=2\pi/\lambda$ is the spatial frequency of a free space wave in vacuum,
$t_h$ is the thickness of the last high index layer,
and the index $n_e$ and $n_1$ are, respectively, the effective index of said mode in the high index layer for said mode, and the index of the low index layer;
said multilayer mirror comprising alternate layers of a low index material and a high index material, said pair of low and high refractive index layers being made of materials respectively identical to said low index material and high index material of said multilayer mirror;
said pair of low and high refractive index layers being respectively made of $SiO_2$ and $Ta_2O_5$.

36. A device as in claim 35, said multilayer mirror being located between said substrate and said pair of low and high refractive index layers.

37. A device according to claim 36, wherein said substrate being selected from the group of an amorphous material and a birefringent crystal.

38. An optical device as in claim 35, said substrate being the window of a laser further comprising a gas column, said multilayer mirror being turned toward said gas column and said high index layer and said grating being turned towards said substrate.

39. A mirror as in claim 17:
said multilayer mirror and said substrate having at least one guided mode of field absorption coefficient $\alpha_a$, said mode having a field radiation coefficient of $\alpha$ in the presence of said grating which is equal or essentially equal to said field absorption coefficient;
the period $\Lambda$ of the grating being adjusted so as to satisfy the coupling synchronism condition $\Lambda=\lambda_0/n_e$ where $\lambda_0$ is the central wavelength of the linewidth of a propagating mode of said multilayer mirror, and $n_e$ is the effective index of said propagating mode at wave length $\lambda_0$ in the multilayer.

40. A device as in claim 21, wherein:
said grating has a period $\Lambda=\lambda_0/n_e$ where $\lambda_0$ is the vacuum wavelength of an incident beam and $n_e$ is the effective index of a leaky mode;
said substrate being curved and forming the focusing mirror of a stable laser resonator.

41. An optical device as in claim 40, the grating comprising grating lines which are azimuthally distributed; and the grating having a spatial frequency spectrum which contains two spatial frequencies, Kg1 and Kg2, each corresponding to the coupling of one incident wavelength into the same mode of the grating waveguide formed by the high refractive index layer and the diffraction grating.

42. An optical device as in claim 41, said grating comprising contiguous spatially multiplexed grating areas.

43. An optical device as in claim 42, said grating comprising two grating areas of parallel orientation and different periods.

44. An optical device as in claim 40, said grating comprising two grating areas of orthogonal orientation and different periods.

45. An optical device as in claim 41, said grating comprising two grating areas of orthogonal orientation and different periods.

46. An optical device as in claim 42, said grating comprising two grating areas of orthogonal orientation and different periods.

47. A microchip laser comprising an active solid medium, a first and a second mirrors, one of said first and second mirrors comprising a device according to claim 44.

48. A microchip laser comprising an active solid medium, a first and a second mirrors, one of said first and second mirrors comprising a device according to claim 45.

49. A microchip laser comprising an active solid medium, a first and a second mirrors, one of said first and second mirrors comprising a device according to claim 46.

50. A method of damping a first polarisation of an incident light comprising a first and a second polarisation components, said method comprising directing said beam of light toward an optical device according to claim 44.

51. A method of damping a first polarisation of an incident light comprising a first and a second polarisation components, said method comprising directing said beam of light toward an optical device according to claim 45.

52. A method of damping a first polarisation of an incident light comprising a first and a second polarisation components, said method comprising directing said beam of light toward an optical device according to claim 46.

* * * * *

UNITED STATES PATENT AND TRADEMARK OFFICE
CERTIFICATE OF CORRECTION

PATENT NO. : 6,680,799 B1
DATED : January 20, 2004
INVENTOR(S) : Olivier Parriaux et al.

It is certified that error appears in the above-identified patent and that said Letters Patent is hereby corrected as shown below:

Column 4,
Lines 56 and 61, "he" should read -- the --;

Column 9,
Line 49, "a" should read -- $\alpha$ -- ;

Column 10,
Line 33, "$\pi$" should read -- $\lambda$ --;

Column 12,
Line 64, "$\Delta\lambda=\alpha\lambda\Lambda/\pi$." should read -- $\Delta\lambda=\alpha\lambda_0\Lambda/\pi$. --; and Column 13,
Line 37, "ends" should read -- end --.

Signed and Sealed this

Twenty-third Day of November, 2004

JON W. DUDAS
*Director of the United States Patent and Trademark Office*